United States Patent [19] [11] Patent Number: 5,966,929
Socha, Jr. [45] Date of Patent: Oct. 19, 1999

[54] IN-LINE EXHAUST SYSTEM FOR A TRANSVERSE MOUNTED V-ENGINE

[75] Inventor: Louis S. Socha, Jr., Painted Post, N.Y.

[73] Assignee: Corning Incorporated, Corning, N.Y.

[21] Appl. No.: 09/100,166

[22] Filed: Jun. 18, 1998

Related U.S. Application Data

[60] Provisional application No. 60/051,064, Jun. 27, 1997.

[51] Int. Cl.[6] .................................................. F01N 3/00
[52] U.S. Cl. .......................... 60/274; 60/300; 60/302; 422/177
[58] Field of Search ............................ 60/274, 284, 297, 60/300, 302, 323; 422/171, 172, 176, 177

[56] References Cited

U.S. PATENT DOCUMENTS

| | | | |
|---|---|---|---|
| 4,671,059 | 6/1987 | Lawson | 60/309 |
| 5,138,834 | 8/1992 | Maund et al. . | |
| 5,233,830 | 8/1993 | Takeshima et al. . | |
| 5,265,420 | 11/1993 | Rutschmann . | |
| 5,365,735 | 11/1994 | Weber et al. | 60/323 |
| 5,538,697 | 7/1996 | Abe et al. | 422/171 |
| 5,787,706 | 8/1998 | Smedler et al. | 60/288 |
| 5,787,707 | 8/1998 | Hertl et al. | 60/297 |

FOREIGN PATENT DOCUMENTS

| 4127633 | 2/1993 | Germany | 60/323 |
|---|---|---|---|

Primary Examiner—Edward K. Look
Assistant Examiner—Binh Tran
Attorney, Agent, or Firm—Timothy M. Schaeberle

[57] ABSTRACT

An exhaust system for a v-configured transverse-mounted internal combustion engine includes a first passage for the first, front manifold exhaust gas stream having a adsorber structure disposed therein and a second passage for the second exhaust gas stream having an catalyst structure disposed therein. The catalyst and the adsorber comprise a single honeycomb adsorber-catalyst structure having a plurality of partition walls extending along an axial direction of the honeycomb structure. The partition walls form at least two portions including a catalyst portion having a catalyst layer provided thereon and an adsorber portion having a adsorber layer supported thereon. Specifically, the portions are separate from each other in a cross-section extending perpendicular to the aforementioned axial direction. The system further includes burn-off catalyst disposed downstream adsorber-catalyst structure.

10 Claims, 4 Drawing Sheets

IN-LINE EXHAUST SYSTEM FOR A TRANSVERSE MOUNTED V-ENGINE

This application claims the benefit of U.S. Provisional Application No. 60/051,064, filed Jun. 27, 1997, entitled IN-LINE EXHAUST SYSTEM FOR A TRANSVERSE MOUNTED V-ENGINE, by Louis S. Socha, Jr.

BACKGROUND OF THE INVENTION

1. Field of the Invention

This invention relates to in-line exhaust system for an v-configured, transverse-mounted internal combustion engine having a front manifold having a first exhaust gas stream and a rear manifold rear having a second exhaust gas stream.

2. Description of the Prior Art

At the present time, automotive exhaust systems equipped with catalytic conversion systems generally comprise an exhaust line connecting with a converter housing, the housing enclosing a ceramic or metal honeycomb substrate supporting an oxidation or, more commonly, a three-way emissions control catalyst. The three-way catalyst operates to oxidize carbon monoxide and unburned hydrocarbons present in the exhaust stream and, with proper control of exhaust stream stoichiometry, to at least partially reduce higher oxides of nitrogen (NOx) contained therein.

Tightened emissions standards for automotive gasoline engines have placed higher demands on the performance of these catalytic conversion systems. Particularly critical for overall system performance is performance during the so-called "cold start" phase of engine operation. This is the period of engine operation covering approximately the first 60 seconds after cold engine start and prior to startup or "light off" of the catalytic converter, during which the highest concentrations of unburned hydrocarbons are released into the atmosphere.

One type of exhaust system designed specifically to address the cold-start problem provides a hydrocarbon adsorber in the exhaust line. The adsorber operates to trap unburned hydrocarbons emitted during engine startup, and then to release those hydrocarbons to a catalytic converter after converter light-off has been achieved. A preferred configuration for an adsorber in such systems is a honeycomb structure, similar in construction to a catalyst support honeycomb but composed of, or supporting, a coating of a hydrocarbon adsorber such as carbon, zeolite, or another molecular sieve material.

Examples of recently developed cold-start engine emissions control systems of this type are disclosed in published patent applications WO 95/18292, EP 0661098 and EP 0697505 (Hertl et al). Two further examples of such system are described in co-pending, commonly assigned U.S. patent application Ser. No. 08/578,003 (Brown et al.) filed Dec. 22, 1995 and entitled "Exhaust System with a Negative Flow Fluidics Apparatus" and U.S. patent application Ser. No. 08/685,130 of J. Anderson et al. filed Jul. 24, 1996 and entitled "Exhaust Gas Fluidics Apparatus".

A common feature of "in-line" systems is a ported honeycomb adsorber, i.e., an adsorber comprising a by-pass port integral with its structure, located downstream of a main or light-off catalytic converter but positioned upstream of a second or so-called "burn-off" catalytic converter. This adsorber functions to trap the hydrocarbons released at engine startup and slowly desorb and release the hydrocarbons to the burn-off converter as the adsorber is heated by the warming exhaust gases. A particular advantage of the ported adsorber design is the faster light-off of the burn-off converter due to exposure of that converter to the hot exhaust gases passing directly through the adsorber port. In the design of Hertl et al., Brown et. al. and Anderson et al., control over the flow of the exhaust gases through or past the adsorber is secured by means of a fluidic diverter which delivers a control gas stream for diverting the exhaust gases toward or away from the adsorber port in the course of engine operation.

V-engines mounted in the transverse position generate two exhaust gases which exhibit two different temperatures when combined together at some point prior to entering a main exhaust pipe. The exhaust coming from the front manifold is cooled as a result of heat loss along the length of a crossover pipe which runs from the front of the engine towards the back and is generally 3 to 4 feet in length. The exhaust from the rear manifold travels a much lesser distance, generally less than a foot, prior reaching a junction where it is mixed with the exhaust from the front manifold. As such, the exhaust gas from the rear manifold exhibits a much higher temperature at the point where the gases are mixed. At this point the temperatures typically differ by as much as 150° C. and as a result, the overall temperature of the mixed exhaust stream is greatly reduced when compared to the single stream of the aforementioned systems described above. Incorporation of the aforementioned in-line exhaust systems at a position downstream of the junction would therefore result in an inefficient configuration which would exhibit a delayed light-off of the main catalyst, when compared to the aforementioned single stream systems. As such, incorporation of these in-line exhaust systems into v-engines, as described would result in an exhaust system which would exhibit poor overall exhaust purification performance.

One example of a v-engine exhaust system which solves the aforementioned problem is disclosed in copending, commonly assigned, U.S. patent application Ser. No. 60/051,122 (Hampton). This reference discloses a system which comprises a first passage for the first, front manifold, exhaust gas stream which has a adsorber disposed therein and second passage for the second exhaust gas stream; (2) a hydrocarbon adsorber positioned so that both the first and second exhaust gas streams are able to flow therethrough, having a first flow region, and a second more obstructed flow region adjacent the first region; and, (3) a fluidics diverter disposed in the second exhaust gas stream upstream, and proximate to the first region of the adsorber for diverting the second exhaust stream away from the first region. Although this system solves the aforementioned problem of lowered temperature stream/delayed catalytic lightoff, the system is complex.

SUMMARY OF THE INVENTION

An object of the invention is to provide an in-line exhaust system for a v-configured, transverse-mounted internal combustion engine which solves the aforementioned lowered temperature stream/delayed light-off problems without employing an intricate system like that for the above-mentioned v-engine exhaust system.

This object can be attained by an in-line exhaust system for a v-configured transverse-mounted internal combustion engine in accordance with the present invention. The system includes the following: (1) a first passage for front manifold first exhaust gas stream having an adsorber structure disposed therein; (2) a second passage for the rear manifold second exhaust gas stream having a catalyst structure disposed therein; and (3) a burn-off catalyst disposed downstream from the adsorber. The catalyst structure and the adsorber comprise a single honeycomb adsorber-catalyst structure having a plurality of partition walls extending along an axial direction of the honeycomb structure. The partition walls form at least two portions including a catalyst portion having a catalyst layer provided thereon and an adsorber portion having a adsorber layer supported thereon. Specifically, the portions are separate from each other in a cross-section extending perpendicular to the aforementioned axial direction.

DETAILED DESCRIPTION OF THE INVENTION

Figure 1:
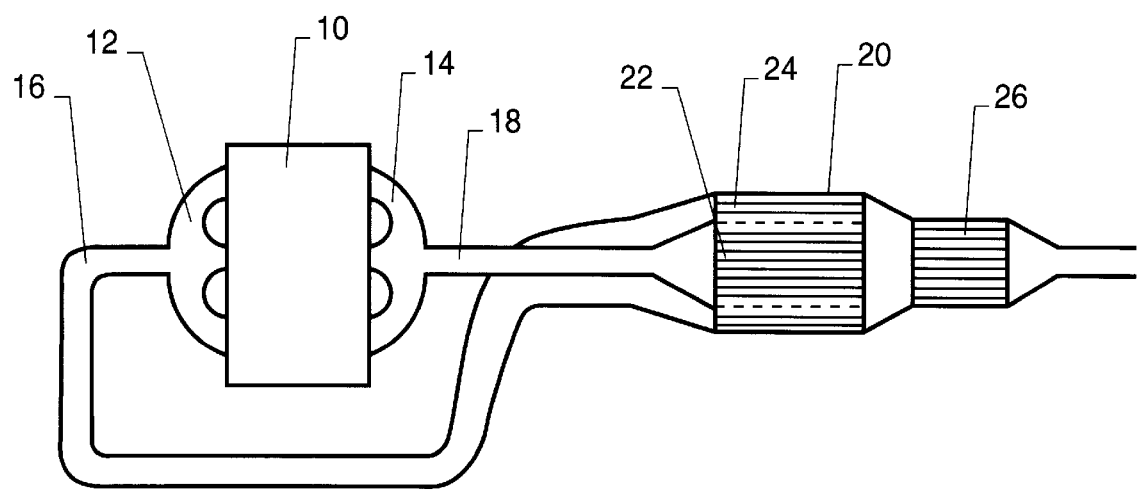
FIG. 1 is a schematic system diagram of the in-line exhaust system of a transverse mounted v-engine in accordance with a first embodiment of the present invention.

FIG. 1 illustrates an arrangement of an exhaust gas-purification system in accordance with a first embodiment of the invention. As illustrated in FIG. 1 a transverse mounted v-configured internal combustion engine 10 is provided having a front manifold 12 having a first exhaust gas stream and a rear manifold 14, having a second exhaust gas stream. A first passage 16 is provided for the first exhaust gas stream and a second passage 18 is provided for the second exhaust gas stream in which is disposed a catalyst structure. The first exhaust passage 16 has disposed therein an adsorber structure while the second exhaust passage 18 has disposed therein a catalyst structure. The catalyst and the adsorber comprise a single honeycomb adsorber-catalyst (or ad-cat) structure 20 having a plurality of partition walls extending along an axial direction of the honeycomb structure. The partition walls form at least two portions including a catalyst portion 22 having a catalyst layer provided thereon and an adsorber-catalyst portion 24 having a adsorber layer supported thereon. Specifically, the portions are separate from each other in a cross-section extending perpendicular to the aforementioned axial direction.

The outlet of the second passage 18 is diverged and positioned proximate to catalyst portion 22 of the ad-cat structure 20 such that the second exhaust gas stream is prevented from entering the adsorber portion 24 but instead is caused to enter and travel through the center portion of the structure; i.e., the catalyst portion 22. The first passage 16 travels under the internal combustion engine 10 and wraps around the outside of the second passage 18. The wrapping of the first passage around the second passage serves to insulate the second exhaust gas stream against heat loss while the first exhaust gas stream experiences heat loss due to the exterior environment. The outlet of the first passage 16 allows the first exhaust gas stream to enter and pass through the adsorber portion 24 of the ad-cat structure 20. As a result of the distance traveled and the insulation of the second passage, the temperature of the first exhaust stream upon entering the adsorber portion is considerably lower than the temperature of the second exhaust gas stream entering the catalyst portion.

The system further includes a burn-off catalyst 26, disposed downstream from the ad-cat structure 20, which serves to catalyze the hydrocarbons of both the first and second exhaust gas streams which may be desorbed by the adsorber portion of the ad-cat structure after that portion has reached its desorption temperature. It is important to design the adsorber portion of the ad-cat structure, i.e., its volume, mass and size, such that the burn-off catalyst reaches lightoff prior to the adsorber portion reaching its desorption temperature; i.e., the system should be such that the desorption is delayed until the burn-off catalyst has reached its lightoff temperature.

In a preferred embodiment the adsorber layer further includes an additional catalyst layer. The benefits of this additional catalyst layer are as follows: (1) earlier conversion of the first exhaust gas stream once the catalyst layer has reached lightoff; (2) the size of the burnoff catalyst can be reduced as a result of the fact that it does have to catalyze the first exhaust gas stream, only the desorbed hydrocarbons.

Figure 2:
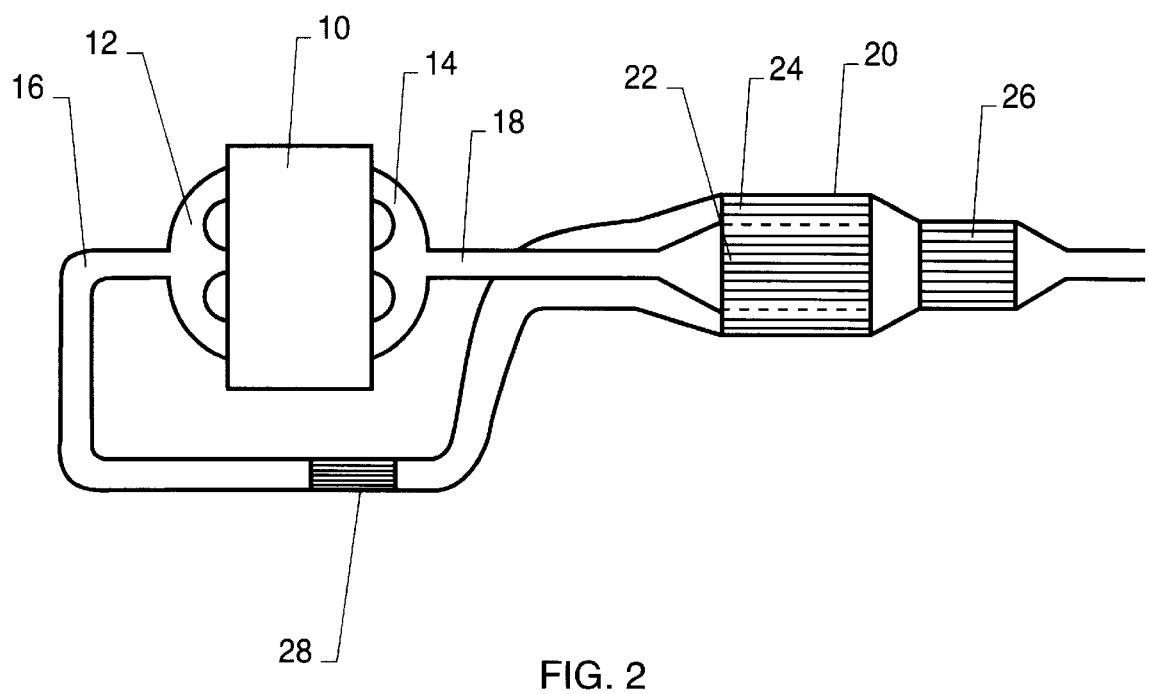
FIG. 2 is a schematic system diagram of the in-line exhaust system of a transverse mounted v-engine in accordance with a second embodiment of the present invention.
Figure 3:
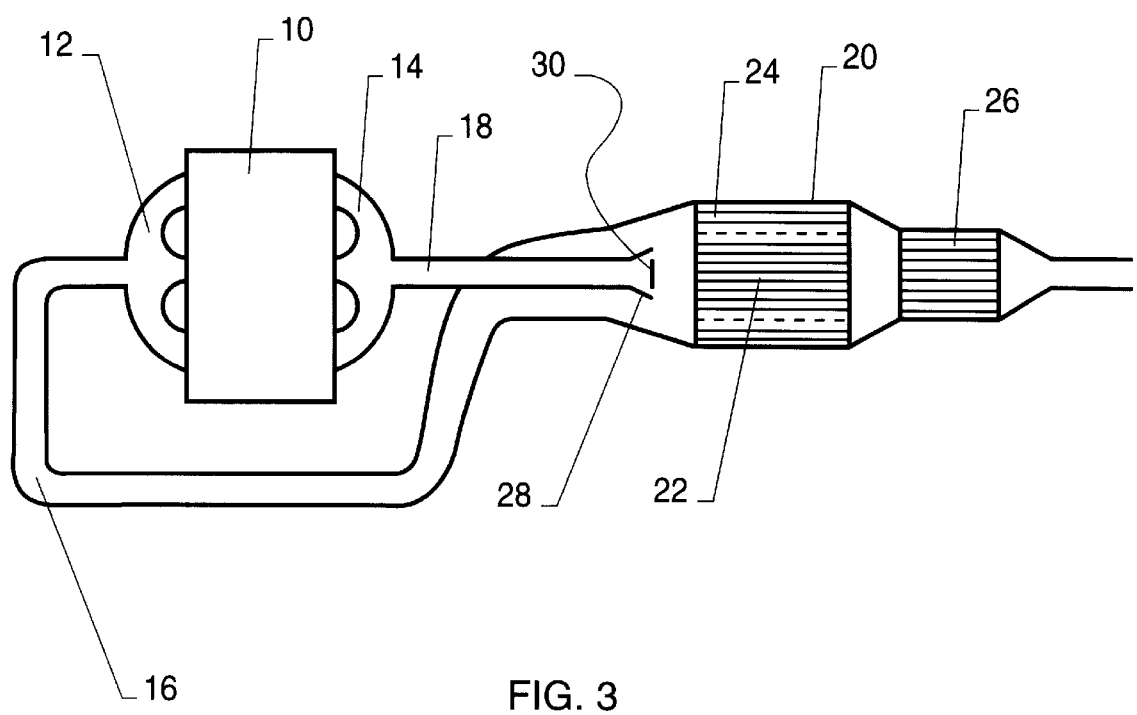
FIG. 3 is a schematic system diagram of the in-line exhaust system of a transverse mounted v-engine in accordance with a second embodiment of the present invention.

FIGS. 2 and 3 illustrate arrangements of in-line exhaust systems for transverse mounted v-engines in accordance with a second and a third embodiment of the invention, respectfully. Since the main difference of the second and third embodiments when compared to the first embodiment includes the addition a preconverter catalyst and a fluidics diverter in the second exhaust gas stream, respectively, like portions of the second and third embodiments having the same structure as those of the first embodiment will be denoted by like numerals.

In the second embodiment, as illustrated in FIG. 2, the first exhaust passage 16 has positioned therein preconverter catalyst 28. One advantage that this embodiment exhibits over the first embodiment is that the low mass/low volume preconverter catalyst, located at point in the first exhaust gas stream upstream of the adsorber portion of the ad-cat structure, serves to lower the temperature of the first exhaust gas stream as it passes through the preconverter catalyst. This in turn, delays the desorption of adsorber portion and allows the catalyst portion to reach a higher operating, which in turn ensures the probability that the downstream burnoff catalyst has reached its light-off temperature prior to the desorption of HC's by the adsorber. Another advantage of this embodiment is that the hydrocarbons in the second exhaust gas stream are catalyzed earlier in the stream. The rest of the exhaust system of the second embodiment, the second exhaust passage 18, the adsorber-catalyst structure 20, and the burn-off catalyst 26 are configured like those described above for the first embodiment.

The operation of the two above systems function in the generally the same manner, as follows. At startup, during cold-start conditions, the second exhaust gas stream flows into the second exhaust gas passage and into and through the catalyst portion of the honeycomb and thereafter the burnoff catalyst, uncatalyzed. For the first few seconds of engine operation, during cold-start, the catalyst portion remains unactive, however due to the short length of second exhaust passage, the inlet gas temperature entering the catalyst portion remains relatively hot, thereby achieving rapid heat up of the catalyst portion of the ad-cat. In other words the catalyst portion of the ad-cat thereby rapidly becomes active, i.e., reaches it lightoff temperature. Once the catalyst portion of the ad-cat has reached lightoff, the second exhaust gas stream is catalyzed by passing though the catalyst portion. Initially the first exhaust gas stream flows into the first exhaust gas passage and into and through the adsorber portion of the ad-cat whereupon the HC's present in the first exhaust gas stream are adsorbed.

After the first and second exhaust gas streams exit the catalyst and adsorber portions of the ad-cat, respectively, they are combined and thereafter enter the second or burnoff catalyst. The temperature of the combined gas stream will be hotter than the first exhaust gas stream exiting the adsorber portion. Thus, as the exhaust gas continues to flow, eventually the burnoff catalyst reaches its lightoff temperature, i.e., it becomes active. Once the burnoff catalyst reaches it lightoff temperature, the adsorbed hydrocarbons of the first exhaust gas stream are desorbed and burned by the burnoff catalyst.

In the third embodiment, illustrated in FIG. 3, the outlet of the second passage 18 is again diverged and positioned proximate to catalyst portion 22 of the ad-cat structure 20. Unlike the earlier embodiments the outlet 28 is positioned proximate to the catalyst portion of the ad-cat so as to allow the second exhaust gas stream to flow away from the catalyst portion 22 and enter the adsorber portion 24. One additional feature of this embodiment is the inclusion of a fluidics diverter 30 which is positioned in the second exhaust gas stream upstream, and proximate to the catalyst portion 22, of the ad-cat structure 20. The second passage's flared outlet 28 and the fluidics diverter 30, when activated, combine to divert the second exhaust gas stream away from the catalyst portion 22 of the ad-cat 20 and into the adsorber portion 24 whereupon any hydrocarbons in the second exhaust gas stream are adsorbed at temperatures below adsorber desorption temperature.

The operation of this system differs from the previous embodiments in that initially the hydrocarbons in both the first and second exhaust gas streams pass through the adsorber portion and thereupon adsorbed. Specifically, the second exhaust stream flows into the second exhaust passage and is diverted by the activated fluidics diverter, away from the catalyst portion and into the adsorber portion of the ad-cat. The first exhaust gas stream lower temperature exhaust gas flows in a like manner as that described in the previous embodiments; through the first exhaust passage and into the adsorber portion of the ad-cat. After the second exhaust gas stream achieves a predetermined temperature, a temperature which will cause nearly instantaneous lightoff of the catalyst portion of the ad-cat, the diverter will be deactivated and the system will operate in a similar manner as the earlier embodiments. In other words, when the fluidics diverted is deactivated the second exhaust gas stream will flow directly through the catalyst portion of the ad-cat. One additional minor difference is that the HC's which are desorbed after the adsorber reaches it desorption temperature (and the burnoff catalyst has reached its lightoff) are both first and second exhaust stream adsorbed HC's.

Figure 4:
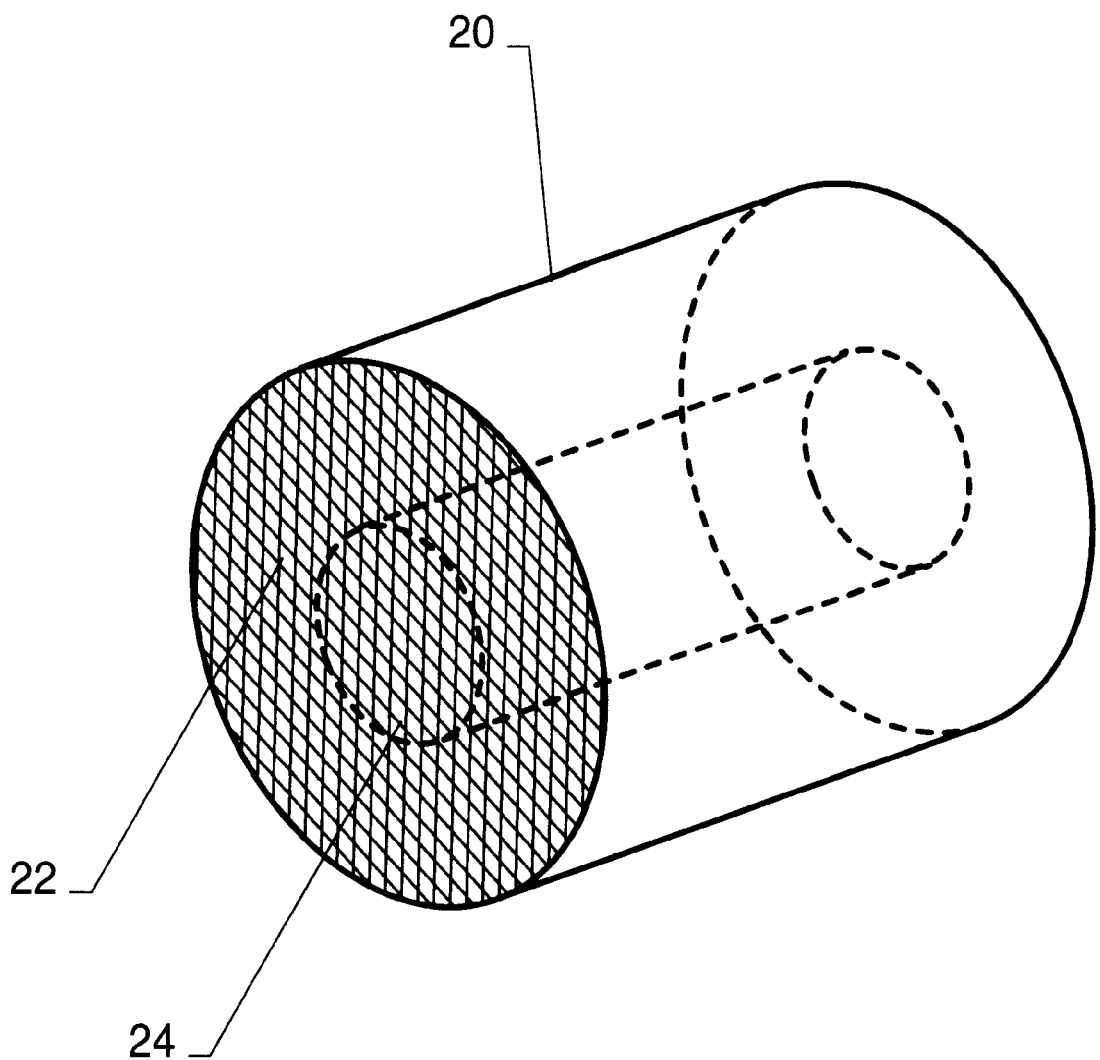
FIG. 4 is a view showing an example of the adsorber-catalyst for use in accordance with the present invention.

Referring now to FIG. 4, illustrated therein is an adsorber-catalyst 20 for use in the present invention. Preferably, the adsorber-catalyst 20 is a honeycomb structure having a circular cross-section (perpendicular to the flow direction of the higher and lower exhaust gas to be purified) and is formed in a cylindrical shape extending parallel to the flow direction. Furthermore, catalyst layer 24 is supported on the inner cylindrical portion of the honeycomb structure, having the same axis as the honeycomb structure. The adsorber layer 22 is supported on the remaining peripheral portion of the honeycomb structure. It has been described in the art that it is preferable for early ignition of the catalyst provided at the downstream side of the catalyst that the cross-sectional area of the catalyst portion is 5–80% of the cross-sectional area of the honeycomb structure. When the cross-sectional area of the catalyst portion is smaller than 5%, the following undesirable conditions result: (1) the catalyst portion generates a small amount of heat when ignited early; (2) the temperature elevation of the downstream catalyst becomes insufficient; (3) the exhaust stream passing through the catalyst portion experiences a significant pressure drop; and, (4) the catalyst portion's conversion efficiency is lowered considerably. When the cross-sectional area of the catalyst portion exceeds 80%, the adsorber portion has a low adsorbability.

In order to make large the temperature difference between the adsorber portion and the catalyst portion, it is preferable to allow the adsorber portion to have a larger heat capacity than the catalyst portion by various methods, for example, (1) making larger the wall thickness of the honeycomb structure at the adsorber portion, (2) making higher the cell density of the honeycomb structure at the adsorber portion, (3) making smaller the porosity of the honeycomb structure at the adsorber portion, (4) supporting a larger amount of an adsorber layer adsorber portion. The reverse is true for the catalyst and the opposite of the various methods listed above to allow the catalyst portion to have a smaller heat capacity than the adsorber portion.

For the purpose of removing harmful components such as HC, CO, $NO_x$ and the like discharged from the internal combustion engine, the catalyst portion, preferably located on the central region of the honeycomb substrate can simply comprise coating the honeycomb structure with a catalyst layer of a heat-resistant oxide containing at least one noble metal selected from Pt, Pd and Rh.

The honeycomb substrate structure useful in the instant invention can be any material suitable for high temperature application such as certain metals, metal alloys, ceramics, glass-ceramics, glass, high surface area-high temperature stable oxides, and combinations of these materials. Examples of useful substrate materials include, cordierite, mullite, clay, talc, zircon, zirconia, spinel, alumina, silica, borides, lithium aluminosilicates, alumina silica, feldspar, titania, fused silica, nitrides, carbides and mixtures of these. Useful metals for the substrate include, substrates formed of iron group metals such as Fe—Al, Fe—Cr—Al alloys, stainless steel, and Fe—Nickel alloys. Preferably, the material of the honeycomb structure, is cordierite, in view of its heat resistance and thermal shock resistance.

The noble metal catalyst used are typically supported on a heat-resistant oxide such as $Al_2O_3$, $SiO_2$, $TiO_2$, or $ZrO_2$, or its heat-resistant oxide. It is particularly preferable to use, as the heat-resistant oxide, an $AL_2O_3$ having a specific area of 100 $m^2$/g or more, because the oxide can support the noble metal in highly dispersed state and the resulting catalyst layer of the honeycomb structure can have improved low temperature ignition property and heat resistance.

The adsorber portion located, preferably on the peripheral if region of the honeycomb structure comprises simply coating the honeycomb with an adsorber layer. Useful adsorber layer materials for the invention include silicates (such as the metallosilicates and titanosilicates) of varying silica-alumina ratios, metalloaluminates (such as germaniumaluminates), metallophosphates, aluminophosphates (such as silico- and metalloaluminophosphates (MeAPO), SAPO, MeAPSO), gallogerminates and combinations of these. Examples of useful metallosilicates include zeolites, gallosilicates, chromosilicates, borosilicates, ferrisilicates. Examples of zeolites which are particularly useful for the invention include, ZSM-5, Beta, gmelinite, mazzite, offretite, ZSM-12, ZSM-18, Beryllophosphate-H, boggsite, SAPO-40, SAPO-41, and combinations of these, most preferably, ZSM-5, Beta, Ultra-stable Y (USY), and mordenite. For such applications, zeolites having high silica/alumina ratios (greater than 10), are more thermally stable and are therefore preferred. Furthermore, it is contemplated that applications maintained under reducing conditions, activated carbon may be the material of choice.

The adsorber layer can be applied onto the honeycomb substrate structure by any known method such as, for example, conventional washcoating or spraying techniques. In the washcoat technique, the substrate is contacted with a slurry containing the adsorber material and other components such as temporary binders, permanent binders or precursors, dispersants and other additives as needed. Such methods are well known in the art. The permanent binder in the slurry includes, for example, aluminum oxide and its precursors, silica, titania, zirconia, rare earth oxides and their precursors, spinel and precursors. The adsorber slurry is then applied (for example, by repeated spraying or dipping) to the substrate until the desired amount of adsorber material has been applied. One useful method for forming zeolite on the surface of a substrate is disclosed in U.S. Pat. No. 3,730,910, herein incorporated by reference.

It is well known that during cold start, adsorbers, zeolites specifically not only trap hydrocarbons but also cause cracking of some hydrocarbons (i.e., coking). To prevent coking, the adsorber may be catalyzed with suitable catalysts. As is well known in the art, noble metal oxidation catalysts such as platinum, rhodium, and palladium, may be added to zeolite adsorber to ensure oxidation of the carbonaceous materials which may result from coking. Any catalyst capable of converting hydrocarbons to water and carbon dioxide may be added to the zeolite. Such catalysts are well known in the art. For example, noble metal catalysts, such as platinum, rhodium, palladium, and mixtures of these are widely used in automotive catalytic converters. These catalysts are capable not only of oxidizing hydrocarbons but also of converting carbon monoxide and NOx in the engine exhaust stream to innocuous products. Such catalysts may be incorporated into the adsorber or adsorber structure by known methods. It is also known that certain zeolite/noble metal combinations such as disclosed in co-assigned U.S. Pat. No. 5,244,852 (herein incorporated by reference) function as three-way catalysts to convert.

The adsorber can also be formed by in situ growth of zeolite, that is, by crystallizing zeolite on the surface of a metal, metal alloy, ceramic, or glass ceramic substrate. A method for crystallizing strong-bound zeolites on the surfaces of monolithic ceramic substrates is disclosed in U.S. Pat. No. 4,800,187, herein incorporated by reference.

Depending on the particular application, the third embodiment engine exhaust system described can be constructed with any one or a combination of fluidics diverters. For example an exhaust system can include a tubular air injection port having a plurality of cone-shaped directional nozzles, an air injection collar having a plurality of nozzles, a tubular air injection port possessing a cone-shaped air injection nozzle, a tubular injection port possessing a diverter body, an air injection tube, an air "knife" as well as combinations of these. It is self evident that for each of the fluidic diverter listed above each would possess a diversion fluid source.

Although a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

I claim:

1. An in-line exhaust system for a v-configured, transverse-mounted internal combustion engine having a front and rear manifold, the front having a first exhaust gas stream and the rear having a second exhaust stream, the exhaust system comprising:

a first passage for the first exhaust gas stream having a honeycomb adsorber structure disposed therein;

a second passage for the second exhaust gas stream having an honeycomb catalyst structure disposed therein;

the catalyst and the adsorber comprising a single honeycomb structure having a plurality of partition walls extending along an axial direction of the honeycomb structure, said partition walls forming at least two portions including, a catalyst portion having a catalyst layer provided thereon and an adsorber portion having a adsorber layer supported thereon, the portions separate from each other in a cross-section extending perpendicular to said axial direction; and a burn-off catalyst disposed downstream from the adsorber-catalyst structure.

2. An exhaust system according to claim 1 wherein the catalyst portion is located in the center region of the honeycomb structure and the adsorber portion is located in the peripheral region of the honeycomb structure.

3. An exhaust system according to claim 1 wherein the adsorber portion further includes a catalyst layer.

4. An exhaust system according to claim 3 wherein a fluidics diverter is disposed in the second exhaust gas stream upstream, and proximate to the catalyst portion, of the honeycomb structure for diverting the second exhaust gas stream away from the catalyst portion.

5. The exhaust system of claim 5 wherein the honeycomb structure is an extruded cordierite structure.

6. A method of treating the exhaust of a v-configured, transverse-mounted internal combustion engine having a front and rear manifold, the front having a first exhaust gas stream and the rear having a second exhaust stream, comprising:

(a) flowing the first exhaust gas stream through a first exhaust passage and into an adsorber honeycomb structure and flowing the second exhaust gas through a second exhaust passage and into a catalyst honeycomb structure, whereby the adsorber portion adsorbs the hydrocarbons from the first exhaust gas stream and thereafter flowing both exhaust streams through a burn-off catalyst;

(b) after lightoff of the burn-off catalyst desorbing hydrocarbons from the adsorber portion and flowing the desorbed hydrocarbons through the burnoff catalyst whereupon they are burned.

7. The method of claim 6 wherein the adsorber honeycomb structure and the catalyst structure comprise a single honeycomb adsorber-catalyst structure having a plurality of partition walls extending along an axial direction of the honeycomb structure, the partition walls forming at least two portions including a catalyst portion having a catalyst layer provided thereon and an adsorber-catalyst portion having a adsorber layer supported thereon wherein the portions are separate from each other in a cross-section extending perpendicular to the axial direction.

8. A method of treating the exhaust of a v-configured, transverse-mounted internal combustion engine having a front and rear manifold, the front having a first exhaust gas stream and the rear having a second exhaust gas stream;

(a) flowing the first exhaust gas stream through a first exhaust passage and into an adsorber honeycomb structure, whereby the adsorber portion adsorbs the hydrocarbons from the first exhaust gas stream;

(b) flowing the second exhaust gas stream through a second exhaust passage and activating a fluidics diverter disposed in the exhaust stream thereby causing the second exhaust gas stream to be diverted into an adsorber honeycomb structure whereby the adsorber portion adsorbs the hydrocarbons from the second exhaust gas stream;

(c) flowing the first and second exhaust streams through a burnoff catalyst;

(d) after the second exhaust gas stream has reached a predetermined temperature deactivating the fluidics diverter causing the second exhaust gas stream to flow into a honeycomb catalyst structure and thereafter through the burnoff catalyst;

(e) after lightoff of the burn-off catalyst desorbing hydrocarbons from the adsorbers and flowing the desorbed hydrocarbons through the burnoff catalyst whereupon they are burned.

9. The method of claim 8 wherein the first stream honeycomb adsorber structure and the second stream honeycomb adsorber structure and the honeycomb catalyst structure comprise a single honeycomb adsorber-catalyst structure having a plurality of partition walls extending along an axial direction of the honeycomb structure, the partition walls forming at least two portions including a catalyst portion having a catalyst layer provided thereon and an adsorber-catalyst portion having a adsorber layer supported thereon wherein the portions are separate from each other in a cross-section extending perpendicular to the axial direction.

10. An in-line exhaust system for a v-configured, transverse-mounted internal combustion engine having a front and rear manifold, the front having a first exhaust gas stream and the rear having a second exhaust stream, the exhaust system comprising:

a first passage for the first exhaust gas stream having a honeycomb adsorber structure disposed therein;

a second passage for the second exhaust gas stream having a honeycomb catalyst structure disposed therein;

the catalyst and the adsorber comprising a single honeycomb structure having a plurality of partition walls extending along an axial direction of the honeycomb structure, said partition walls forming at least two portions including a catalyst portion having a catalyst layer provided thereon and an adsorber portion having a adsorber layer supported thereon, the portions separate from each other in a cross-section extending perpendicular to said axial direction;

a fluidics diverter is disposed in the second exhaust gas stream upstream, and proximate to the catalyst portion, of the honeycomb structure for diverting the second exhaust gas stream away from the catalyst portion; and, a burn-off catalyst disposed downstream from the adsorber-catalyst structure.

* * * * *

UNITED STATES PATENT AND TRADEMARK OFFICE
CERTIFICATE OF CORRECTION

PATENT NO. : 5,966,929
DATED : October 19, 1999
INVENTOR(S) : Socha, Jr.

It is certified that error appears in the above-identified patent and that said Letters Patent is hereby corrected as shown below:

Column 6, line 56, delete "if".

Column 8, line 1 of claim 5, "The exhaust system of claim 5" should be --The exhaust system of claim 1--.

Signed and Sealed this

Twenty-first Day of November, 2000

Attest:

Q. TODD DICKINSON

*Attesting Officer*          *Director of Patents and Trademarks*